US012607138B2

(12) United States Patent
Morikawa

(10) Patent No.: US 12,607,138 B2
(45) Date of Patent: Apr. 21, 2026

(54) ENGINE-MOUNTED APPARATUS

(71) Applicant: YAMABIKO CORPORATION, Tokyo (JP)

(72) Inventor: Yohei Morikawa, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/973,524

(22) Filed: Dec. 9, 2024

(65) Prior Publication Data

US 2025/0101894 A1 Mar. 27, 2025

Related U.S. Application Data

(63) Continuation of application No. PCT/JP2022/024488, filed on Jun. 20, 2022.

(51) Int. Cl.
*F01M 11/04* (2006.01)
*B67D 7/32* (2010.01)

(52) U.S. Cl.
CPC ....... *F01M 11/0458* (2013.01); *B67D 7/3209* (2013.01)

(58) Field of Classification Search
CPC .......................... B67D 7/3209; F01M 11/0458
USPC .......................... 141/86, 311 A; 137/311–313
See application file for complete search history.

(56) References Cited

U.S. PATENT DOCUMENTS 8,430,136 B2 * 4/2013 Brasher ................ H01H 9/0044 137/313
9,677,551 B2 * 6/2017 Mistry .................... F04B 39/16
12,091,997 B1 * 9/2024 Arora ................. F01M 11/0458
2019/0338701 A1 11/2019 Sarder et al.

FOREIGN PATENT DOCUMENTS

JP 2008-138527 A 6/2008
JP 2014-238043 A 12/2014
JP 2020-190223 A 11/2020

OTHER PUBLICATIONS

ISR cited in International Appln. No. PCT/JP2022/024488 dated Aug. 15, 2022, with English Translation.
Written Opinion cited in International Appln. No. PCT/JP2022/024488 with English Translation.

* cited by examiner

*Primary Examiner* — Timothy L Maust
(74) *Attorney, Agent, or Firm* — BACON & THOMAS, PLLC

(57) ABSTRACT

An engine-mounted apparatus includes a waste liquid recovery mechanism including: a frame being able to be drawn out of the housing via an opening provided on a side wall of the housing; a cover plate fixed to an outer end of the frame outside the housing, and configured to cover the opening from an outside of the side wall when the frame is stored; a retaining member fixed to an inner end of the frame inside the housing, and configured to abut on an inner surface of the side wall to hold the frame while a front surface of the cover plate faces obliquely downward when the frame is drawn out; and a waste liquid flow path provided in the frame, and including a waste liquid port penetrating the cover plate and protruding outward.

5 Claims, 7 Drawing Sheets

ENGINE-MOUNTED APPARATUS

CROSS-REFERENCE TO RELATED APPLICATIONS

The present application is a continuation application of PCT Internal Application No. PCT/JP2022/024488 filed on Jun. 20, 2022, and the entire contents of which are hereby incorporated by reference.

BACKGROUND

1. Technical Field

The present invention relates to an apparatus in which an engine is mounted, for example, an engine generator, an engine welder, and an engine compressor.

2. Related Art

An engine-mounted apparatus includes a waste liquid recovery mechanism for changing engine oil and coolant liquid. Conventionally, as a waste liquid recovery mechanism of the engine-mounted apparatus, there has been known an oil drain apparatus including an oil pan with an oil exhaust port provided under an engine, and a drain plug provided in the lower end of the engine-mounted apparatus. The oil exhaust port and the drain plug are connected to one another via a flexible hose to discharge depleted engine oil from the drain plug to the outside via the hose. See Japanese Patent Application Laid-Open No. 2008-138527. The entire contents of this disclosure are hereby incorporated by reference.

SUMMARY

The engine-mounted apparatus according to the invention includes a housing in which an engine is mounted; and a waste liquid recovery mechanism configured to discharge waste liquid from the engine to an outside of the housing to recovery the waste liquid. The waste liquid recovery mechanism includes: a frame being able to be drawn out of the housing via an opening provided on a side wall of the housing; a cover plate fixed to an outer end of the frame outside the housing, and configured to cover the opening from an outside of the side wall when the frame is stored; a retaining member fixed to an inner end of the frame inside the housing, and configured to abut on an inner surface of the side wall to hold the frame while a front surface of the cover plate faces obliquely downward when the frame is drawn out; and a waste liquid flow path provided in the frame, and including a waste liquid port penetrating the cover plate and protruding outward.

DETAILED DESCRIPTION

In order to normally operate and exert its performance, the engine-mounted apparatus as an engine generator or the like needs to conduct regular maintenance such as oil change. However, in a case where the oil is changed by using the conventional waste liquid recovery mechanism, when the front end of the flexible hose disposed in the apparatus is taken out of the apparatus, the oil drips from the tip of the hose. This is likely to cause a problem that worker's hands are soiled with the oil, and the oil adheres to the housing of the apparatus.

The oil adhering on the housing of the apparatus causes a problem that it takes a lot of trouble to wipe away the oil. In addition, when the oil adhering on the housing of the apparatus is left, the oil drops onto the ground along the wall surface of the housing. This causes a problem that the ground is soiled with the oil, thereby leading to environmental pollution.

The present invention is intended to address the above-described circumferences. Therefore, a problem to be solved by the invention is to make it possible to perform the work for recovering waste liquid at the maintenance of an engine-mounted apparatus in a clean condition without a lot of labor, while avoiding a risk of soiling the apparatus and environmental pollution.

Hereinafter, an embodiment of the present invention will be described with reference to the drawings. The same reference numbers in the different drawings indicate the same functional parts, and therefore repeated description for each of the drawings is omitted.

Figure 1:
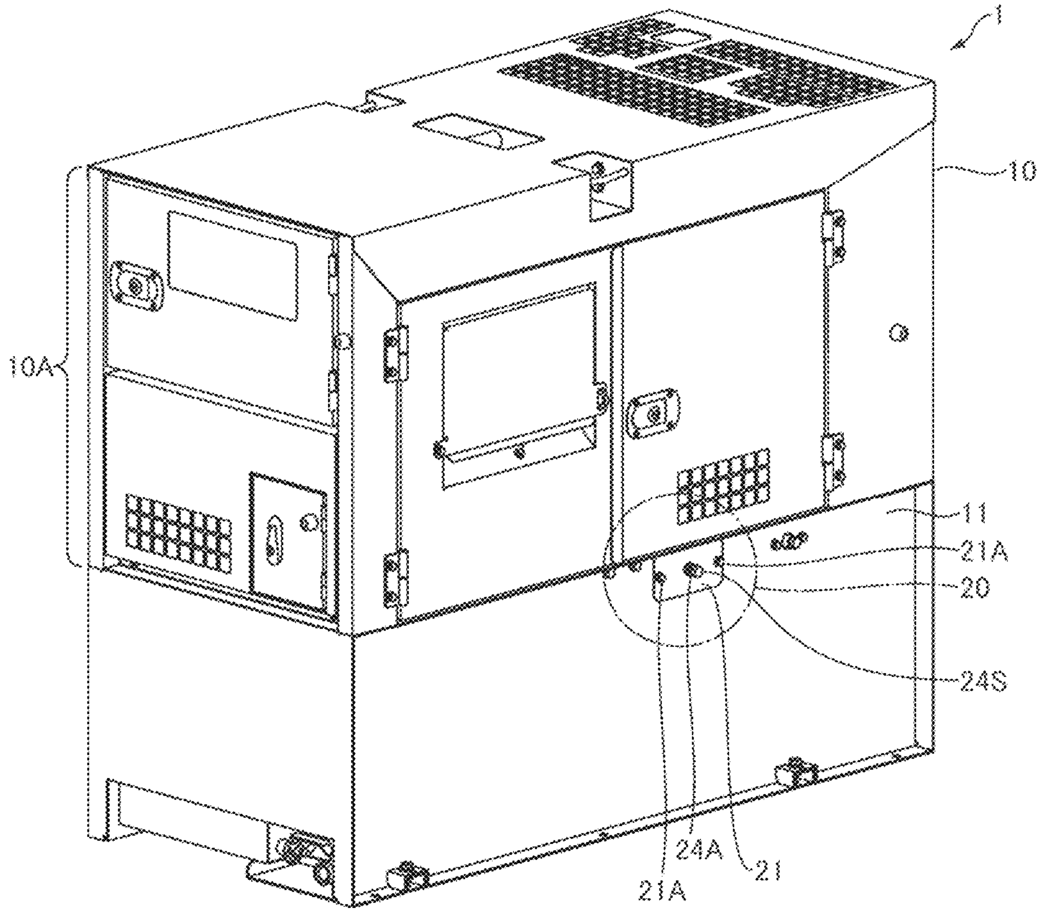
FIG. 1 is a perspective view illustrating the appearance of an engine-mounted apparatus according to an embodiment of the invention.

As illustrated in FIG. 1, an engine-mounted apparatus 1 includes a housing 10 in which an engine is mounted, and a waste liquid recovery mechanism 20 provided on a side wall 11 of the housing 10. FIG. 1 illustrates a state where the waste liquid recovery mechanism 20 is stored in the housing 10. A cover plate 21 attached to the side wall 11 with fastening members (bolts) 21A is exposed to the outside of the housing 10. A waste liquid port 24A of the waste liquid recovery mechanism 20, and a sealing stopper 24S to seal the waste liquid port 24A are provided on the cover plate 21.

The engine-mounted apparatus 1 is not limited as long as an apparatus in which an engine is mounted. For example, the engine-mounted apparatus 1 may be an engine generator, an engine welder, and an engine compressor. The waste liquid recovery mechanism 20 of the engine-mounted apparatus 1 is disposed, for example, under an engine-mounted part 10A of the housing 10. The waste liquid recovery mechanism 20 is configured to discharge waste liquid of the engine such as engine oil, coolant liquid, and fuel to the outside of the housing 10 to recovery the waste liquid.

Figure 2:
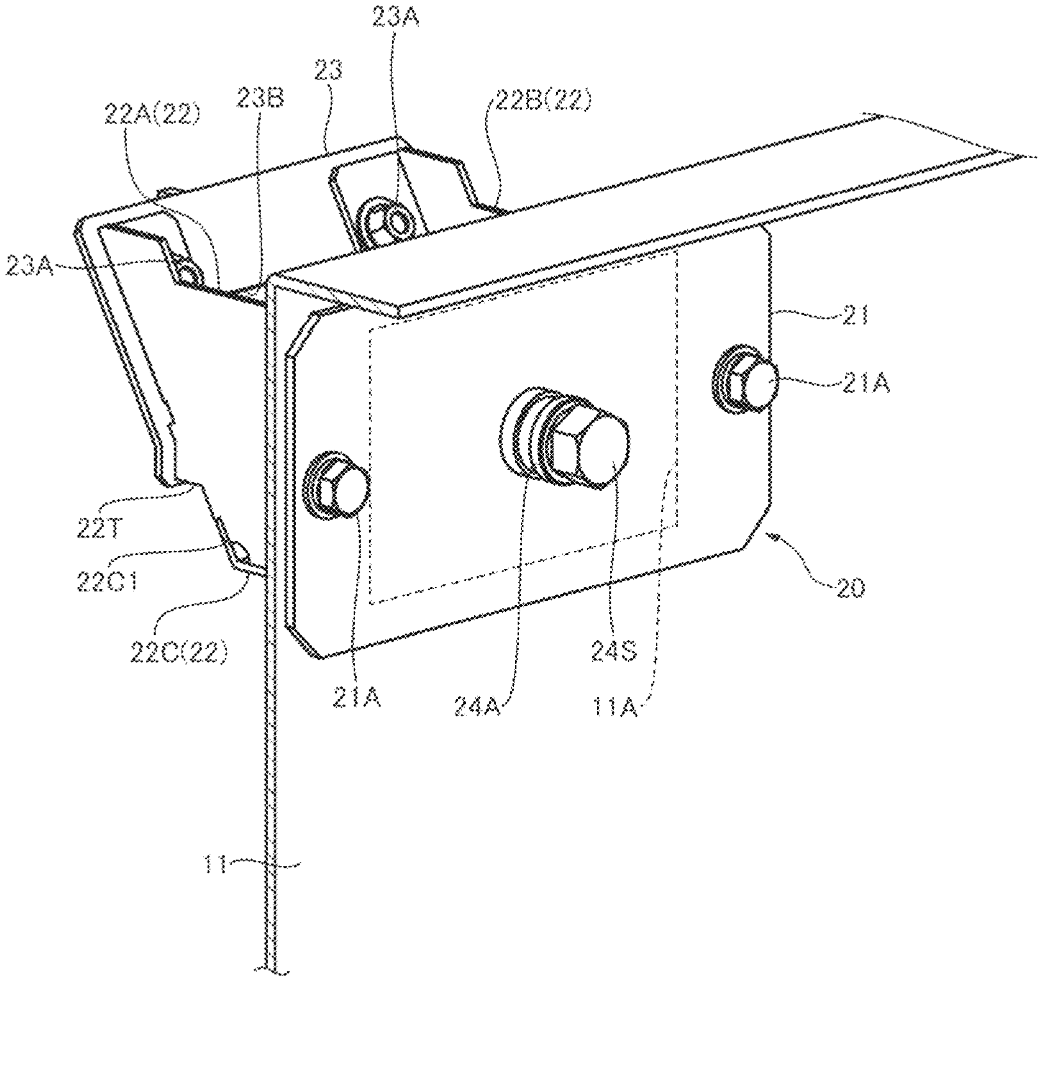
FIG. 2 illustrates a state in which a waste liquid recovery mechanism is stored.
Figure 3:
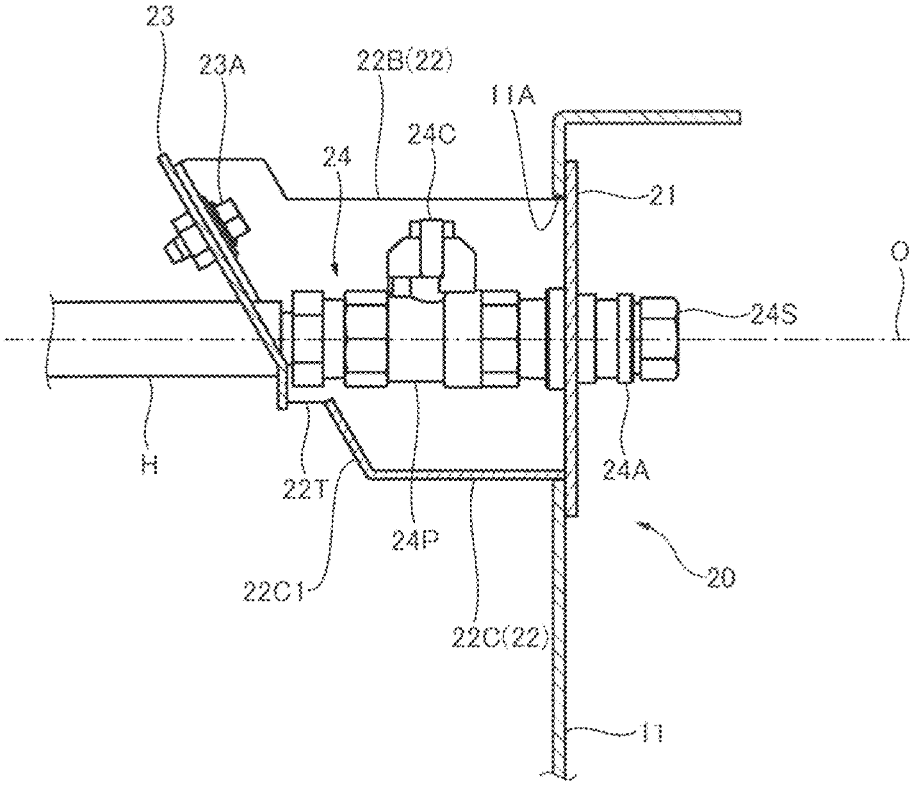
FIG. 3 illustrates a state in which the waste liquid recovery mechanism is stored.
Figure 4:
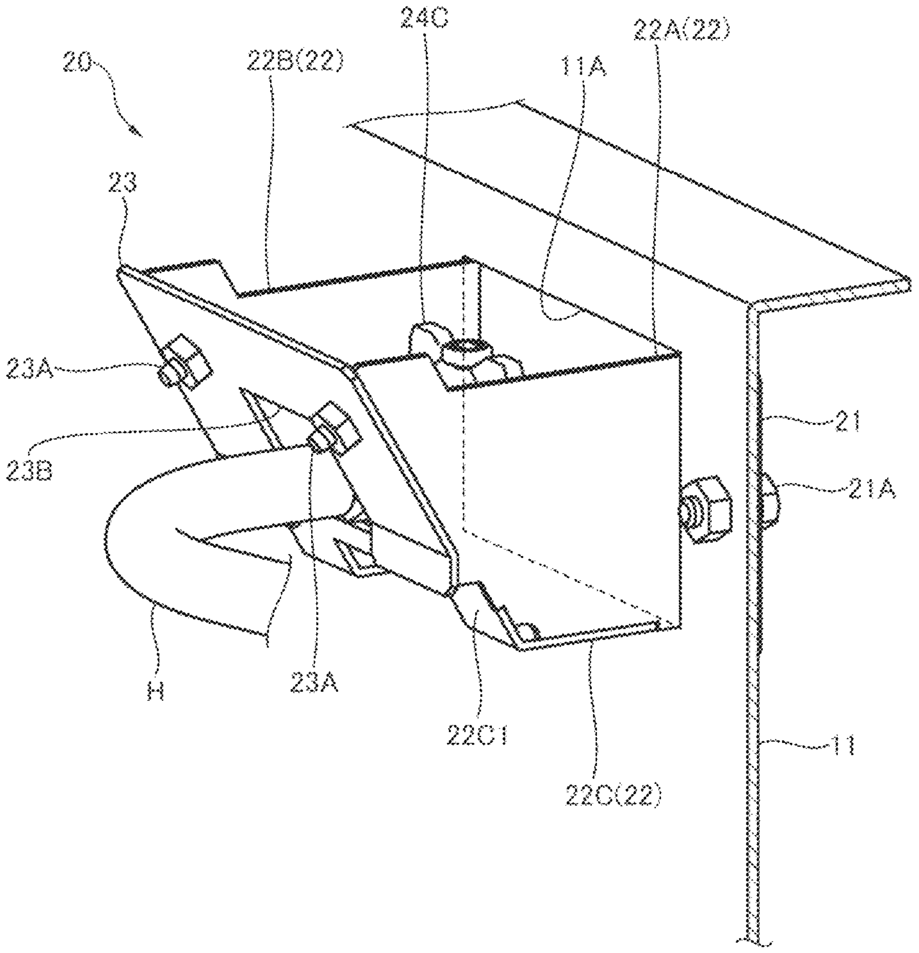
FIG. 4 illustrates a state in which the waste liquid recovery mechanism is stored.

Each of FIG. 2 to FIG. 4 illustrates a state where the waste liquid recovery mechanism 20 is stored while the inside and the outside of the side wall 11 is shown. The waste liquid recovery mechanism 20 includes the above-described cover plate 21, a flame 22, and a retaining member 23. A waste liquid flow path 24 is provided in the frame 22.

The frame 22 can be drawn out of the housing 10 via an opening 11A provided on the side wall 11 of the housing 10. As the illustrated example, the opening 11A is a rectangular hole. The frame 22 has a size that allows the frame 22 to pass through the opening 11A, and the contour of the cross section of the frame 22 intersecting a central axis O of the waste liquid flow path 24 has a box shape. To be more specific, the frame 22 having a box shape is open-topped, and includes a pair of side frames 22A and 22B disposed approximately parallel to one another, and a bottom 22C arranged to connect between the lower ends of the side frames 22A and 22B. The frame 22 is not limited to have a box shape, but the contour of the cross section of the frame 22 intersecting the central axis O of the waste liquid flow path 24 may have a V shape or a U shape. In this case, the shape of the opening 11A corresponds to the shape of the frame 22.

The cover plate 21 is fixed to the outer end of the frame 22 outside the housing 10, and closes the opening 11A from the outside of the side wall 11 when the frame 22 is stored. The area of the cover plate 21 is greater than that of the opening 11A. The cover plate 21 can be attached to the side wall 11 with the fastening members (bolts) 21A while closing the opening 11A. With the illustrated example, the pair of fastening members (bolts) 21A are attached on the right and left outside of the opening 11A.

The waste liquid flow path 24 provided in the frame 22 includes a waste liquid port 24A penetrating the cover plate 21 and protruding outward. With the illustrated example, the waste liquid flow path 24 includes a waste liquid plug 24P to which an end of a waste liquid hose H provided in the housing is connected. The sealing stopper 24S is removably attached to the head end of the waste liquid plug 24P serving as the waste liquid port 24A. Here, with the illustrated example, the head end of the waste liquid plug 24P is directly attached to the cover plate 21. However, the head end of the waste liquid plug 24P may be fixed to a separate support member, and this support member may be attached to the cover plate 21.

Moreover, with the illustrated example, the waste liquid plug 24P is provided with an open/close cock 24C which can be operated when the frame 22 is drawn out. When the open/close cock 24C is operated to be open, the waste liquid flow path 24 is opened to allow the waste liquid to flow out of the waste liquid port 24A. On the other hand, when the open/close cock 24C is operated to be closed, the waste liquid flow path 24 is closed not to flow the waste liquid out of the waste liquid port 24A. The open/close cock 24C is exposed to the upper side of the open-topped frame 22, and can be operated to be open and closed by drawing out the frame 22 from the side wall 11.

The retaining member 23 is fixed to the inner end of the frame 22 with a fastening member 23A inside the housing 10. The retaining member 23 has a vertical width and a horizontal width not to fully remove the frame 22 out of the opening 11A when the frame 22 is being drawn out.

When the waste liquid recovery mechanism 20 is assembled, the frame 22 with the fixed cover plate 21 is inserted into the opening 11A from the outside of the side wall 11, and then the retaining member 23 is fixed to the inner end of the frame 22 with the fastening member 23A. Here, the retaining member 23 includes an insert opening 23B to allow the waste liquid flow path 24 to pass through the frame 22.

Figure 5:
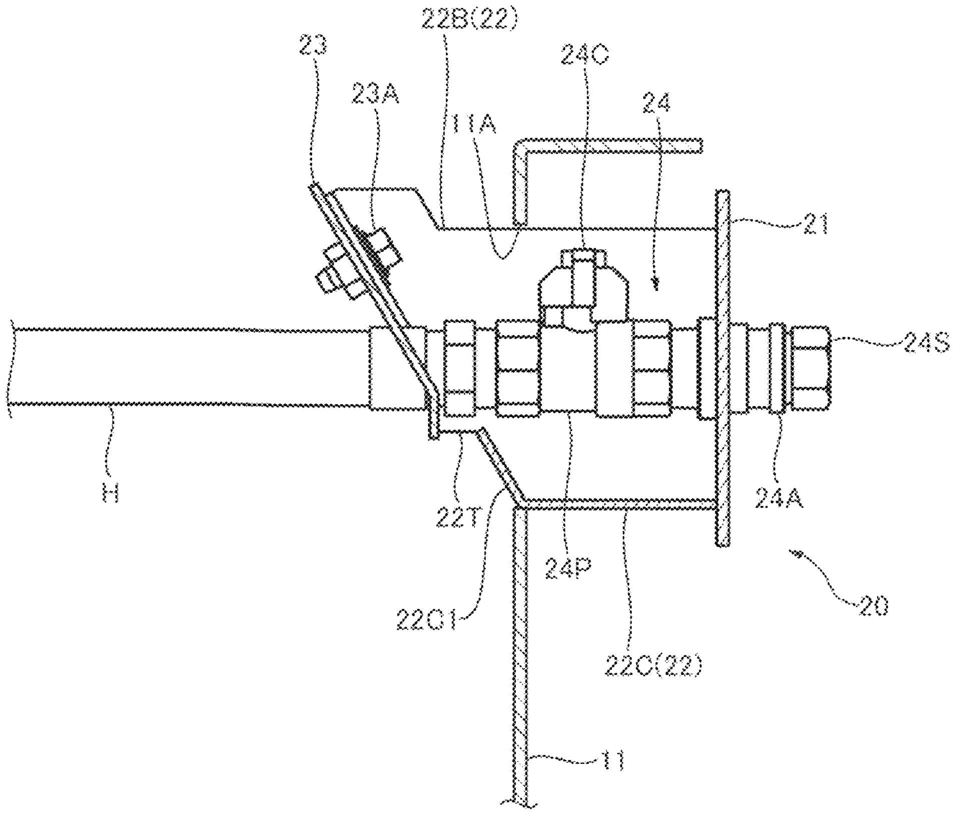
FIG. 5 illustrates a step of drawing the waste liquid recovery mechanism.
Figure 6:
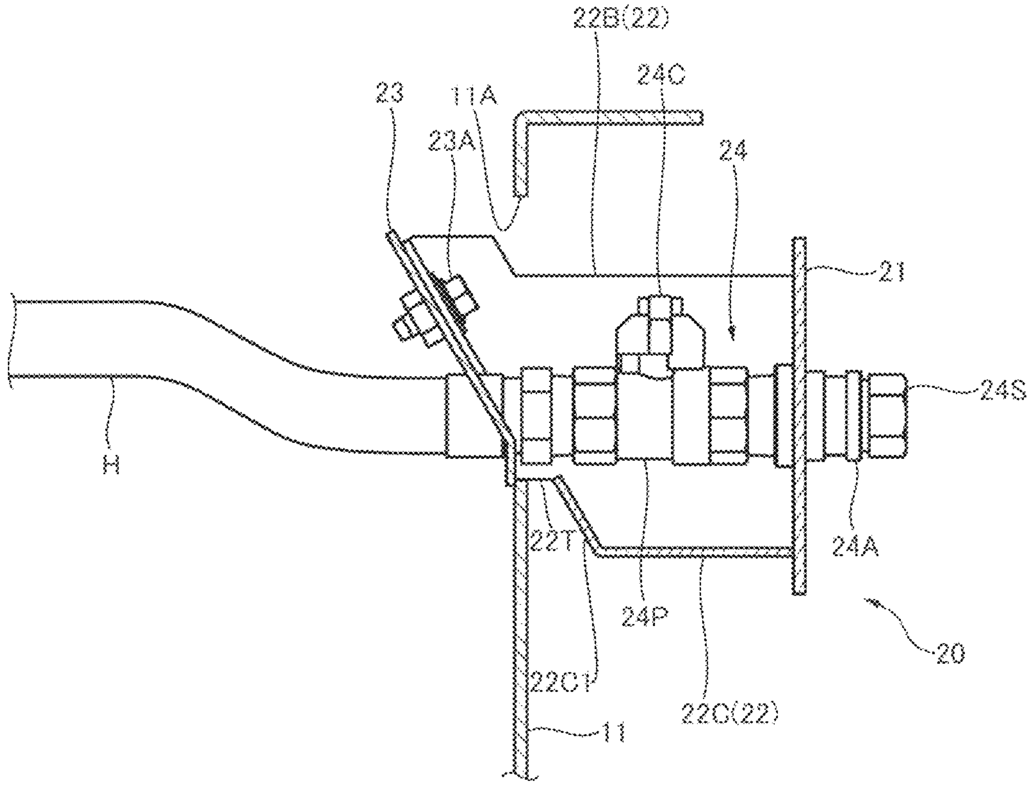
FIG. 6 illustrates a step of drawing the waste liquid recovery mechanism.
Figure 7:
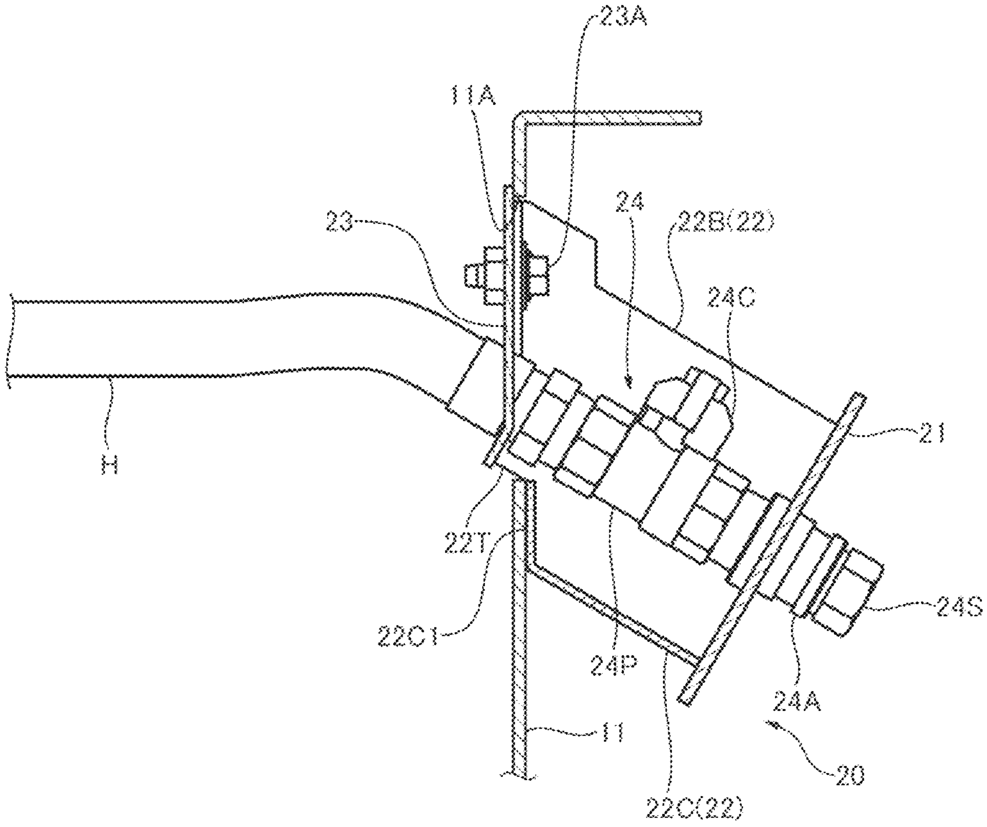
FIG. 7 illustrates a step of drawing the waste liquid recovery mechanism.

FIG. 5 to FIG. 7 illustrate the waste liquid recovery mechanism 20 being drawn out step by step. To draw out the waste liquid recovery mechanism 20 from the housing 10, first the fastening members (bolts) 21A are removed to allow the cover plate 21 to be separated from the side wall 11. Then, the frame 22 with the fixed cover plate 21 is drawn out of the housing 10 step by step as illustrated in FIG. 5 to FIG. 7.

In this case, the frame 22 includes a stepped portion 22T formed in the lower end. The bottom 22C of the frame 22 includes an inclined surface 22C1 toward the stepped portion 22T. By this means, when the bottom 22C is slid along the lower edge of the opening 11A to draw out the frame 22 from the housing 11 as illustrated in FIG. 5, the stepped portion 22T falls onto the lower edge of the opening 11A as illustrated om FIG. 6. After that, the frame 22 drawn out of the side wall 11 is turned downward with the stepped portion 22T as a fulcrum and inclined.

Then, when the frame 22 drawn out of the side wall 11 is turned downward with the stepped portion 22T as a fulcrum by its own weight, an inclined surface 22C1 of the bottom 22C of the frame 22 abuts on the outer surface of the side wall 11. By this means, the frame 22 is held while being inclined as illustrated in FIG. 7. Here, the stepped portion 22T of the frame 22 is eccentrically located on the inner side of the housing 10, and therefore the center of gravity of the frame 22 with the cover plate 21 fixed to the outer end and the waste liquid flow path 24 provided therein is located more outside the housing 10 than the stepped portion 22T. By this means, the frame 22 drawn out of the side wall 11 is turned downward with the stepped portion 22T as a fulcrum by its own weight.

Meanwhile, the retaining member 23 fixed to the inner end of the frame 22 in the housing 10 faces the cover plate 21 while being inclined with respect to the cover plate 21. By this means, when the frame 22 is drawn out of the side wall 11 as illustrated in FIG. 7, the retaining member 23 abuts on the inner surface of the side wall 11 to hold the frame 22 while the front surface of the cover plate 21 faces obliquely downward.

According to the waste liquid recovery mechanism 20 as described above, when the waste liquid of the engine such as engine oil is discharged to the outside of the housing 10 via the waste liquid flow path 24 stored in the housing 10 of the engine-mounted apparatus 1 to recover the waste liquid, the worker simply draws the cover plate 21 and the frame 22 from the side wall 11 without directly touching the waste liquid flow path 24. By this means, it is possible to hold the waste liquid port 24A in the position apart from the side wall 11 of the housing 10 while the waste liquid port 24A faces downward. As a result, it is possible to perform the maintenance work for recovering the waste liquid without soiling the worker's hands, and also soiling the housing 10 of the engine-mounted apparatus 1 with the waste liquid.

In this case, with the illustrated example, the frame 22 has a box shape, and the opening 11A from which the frame 22 is drawn is formed as a rectangular hole. Therefore, the opening 11A functions as a guide hole to draw out or store the frame 22, and consequently it is possible to smoothly draw out and store the frame 22. Here, the frame 22 does not necessarily have a box shape, but the opening 11A is set to correspond to the shape of the cross section of the frame 22. By this means, it is possible to provide the same effect.

In addition, when the frame 22 is drawn out, the stepped portion 22T falls onto the lower edge of the opening 11A. By this means, the frame 22 can be turned with the stepped portion 22T as a fulcrum, and therefore the part of the frame 22 drawn out from the side wall 11 is inclined downward by its own weight. Then, the inclined surface 22C1 of the bottom 22C toward the stepped portion 22T abuts on the outer surface of the side wall 11; the retaining member 23 fixed to the inner end of the frame 22 in the housing 10 abuts on the inner surface of the side wall 11; and the part of the frame 22 drawn out from the side wall 11 is held while being inclined downward. Therefore, by simply drawing out the frame 22 from the opening 11A, it is possible to stably hold the waste liquid port 24A held by the cover plate 21 while the waste liquid port 24A faces downward.

By this means, when the sealing stopper 24S attached to the waste liquid port 24A is removed by using a tool, the waste liquid port 24A is firmly held by the side wall 11 via the frame 22. Therefore, it is possible to attach and remove the sealing stopper 24S with a good workability. In addition, when the open/close cock 24C is operated to be open after the sealing stopper 24S is removed, the waste liquid port 24A is held by the side wall 11 via the frame 22 all the while the waste liquid is discharged from the waste liquid port 24A. Therefore, the worker does not need to hold the waste liquid port 24A by the hand. By this means, the worker can perform another work while the waste liquid is discharged from the waste liquid port 24A.

Then, the waste liquid port 24A is held in the position apart from the housing 10 of the engine-mounted apparatus 1 both when the sealing stopper 24S is removed and when the sealing stopper 24S is attached. Therefore, it is possible to avoid a risk of soiling the housing 10 with the waste liquid when the waste liquid is discharged from the waste liquid port 24A. Otherwise, a waste liquid tray may be arranged under the waste liquid port 24A before the sealing stopper 24S is removed. By this means, it is possible to avoid a risk that the waste liquid drops onto the ground thereby causing environmental pollution.

Moreover, the waste liquid flow path 24 (waste liquid plug 24P) drawn out from the side wall 11 is always disposed in and enclosed with the frame 22. Therefore, it is possible to avoid inconvenience that the waste liquid flow path 24 is damaged due to interference with some part when the frame 22 is drawn out or stored.

According to the invention having the above-described features, it is possible to perform the work for recovering waste liquid at the maintenance of the engine-mounted apparatus in a clean condition without a lot of labor, while avoiding a risk of soiling the apparatus and environmental pollution.

As described above, the embodiments of the present invention have been described in detail with reference to the drawings. However, the specific configuration is not limited to the embodiments, and the design can be changed without departing from the scope of the present invention. In particular, the number of the waste liquid flow path 24 provided in the frame 22 is not limited to one, but may be two or more. When the number is two or more, the waste liquid flow paths

24 may be provided to correspond to kinds of waste liquid, respectively. By this means, it is possible to discharge and recovery two or more kinds of waste liquid at the same time. The above-described embodiments can be combined by utilizing each other's technology as long as there is no particular contradiction or problem in the purpose and configuration.

The invention claimed is:

1. An engine-mounted apparatus comprising:

a housing in which an engine is mounted; and a waste liquid recovery mechanism configured to discharge waste liquid from the engine to an outside of the housing to recover the waste liquid, the waste liquid recovery mechanism including:

a frame being able to be drawn out of the housing via an opening provided on a side wall of the housing;

a cover plate fixed to an outer end of the frame outside the housing, and configured to cover the opening from an outside of the side wall when the frame is stored;

a retaining member fixed to an inner end of the frame inside the housing, and configured to abut on an inner surface of the side wall to hold the frame while a front surface of the cover plate faces obliquely downward when the frame is drawn out; and a waste liquid flow path provided in the frame, and including a waste liquid port penetrating the cover plate and protruding outward.

2. The engine-mounted apparatus according to claim 1, wherein a bottom of the frame includes a stepped portion that serves as a fulcrum for inclining the frame when the frame is drawn out.

3. The engine-mounted apparatus according to claim 1, wherein a bottom of the frame includes an inclined surface abutting on an outer surface of the side wall to hold the frame being inclined when the frame is drawn out.

4. The engine-mounted apparatus according to claim 1, wherein:

the waste liquid flow path includes a waste liquid plug to which an end of a waste liquid hose provided in the housing is connected; and a sealing stopper is removably attached to a head end of the waste liquid plug serving as the waste liquid port.

5. The engine-mounted apparatus according to claim 4, wherein the waste liquid plug is provided with an open/close cock being able to be operated when the frame is drawn out.

* * * * *